Figure 1:
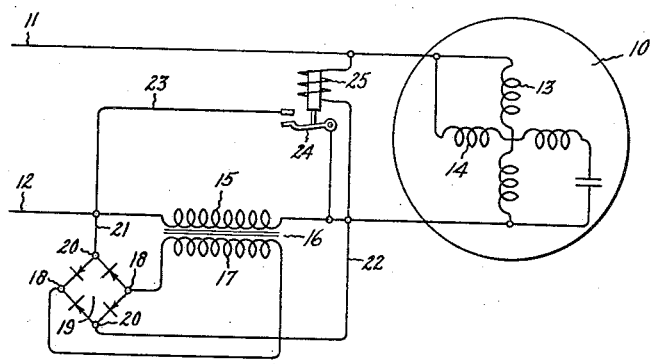

June 24, 1941.    L. W. THOMPSON    2,247,073
APPARATUS FOR STARTING ELECTRIC MOTORS
Filed Feb. 3, 1939

Inventor:
Louis W. Thompson,
by Harry E. Dunham
His Attorney.

Patented June 24, 1941

2,247,073

UNITED STATES PATENT OFFICE 2,247,073

APPARATUS FOR STARTING ELECTRIC MOTORS

Louis W. Thompson, Schenectady, N. Y., assignor to General Electric Company, a corporation of New York Application February 3, 1939, Serial No. 254,429

7 Claims. (Cl. 172—289)

My invention relates to the starting of electric motors, particularly small electric motors such as may be started by connection directly to a supply circuit, and has for its object apparatus for starting electric motors in such a manner as to prevent the detrimental flicker of electric lamps connected to the same electric supply circuit as the motor.

It is customary in the starting of certain types of small electric motors, especially alternating-current capacity and split-phase motors, to connect the motor directly to the electric supply source without external starting resistance. This method of starting results in a starting current several times greater than the full load running current of the motor and has the disadvantage of causing momentary dimming or flicker of the electric lamps connected to the motor supply circuit either directly or by a supply transformer. In fact, small electric motors are most often constructed for a 110 or 220 volt supply source so that they may be connected directly to an electric lamp circuit. This flicker of the lamps is caused by voltage drop in the lighting circuit, hence lower current in the lamps, resulting from the relatively low initial impedance of the motor. As the motor accelerates, its impedance increases to a steady-state or working value and the lamps resume their original or approximately original brightness.

To minimize lamp flicker, which is generally perceptible in ordinary household lamps upon the starting of refrigerator motors, oil burner motors, and the like and constitutes a considerable source of annoyance to persons utilizing the lamplight, it is proposed to provide a saturable core reactor in series circuit with the supply and the motor having a high reactance which will reduce the current drawn by the motor at a standstill. A direct-current winding having a relatively high inductance is provided on a common core with the reactor for gradually increasing the flux in the reactor core and thereby decreasing the reactance value of the reactor. The high inductance of the direct-current winding introduces a time delay in the building up of the direct current in this winding, this time delay being variable in accordance with the inductance value to introduce a quarter second or half second delay before the full value of the direct current is reached. A voltage responsive relay having its windings connected across the terminals of the motor is used to short circuit the reactor when its minimum reactance value has been reached for applying thereafter full line voltage to the motor. The initial high reactance of the reactor and the gradual decrease of its reactance value minimizes the usual sharp flicker of electric lamps which occurs when high currents are drawn suddenly.

Figure 2:
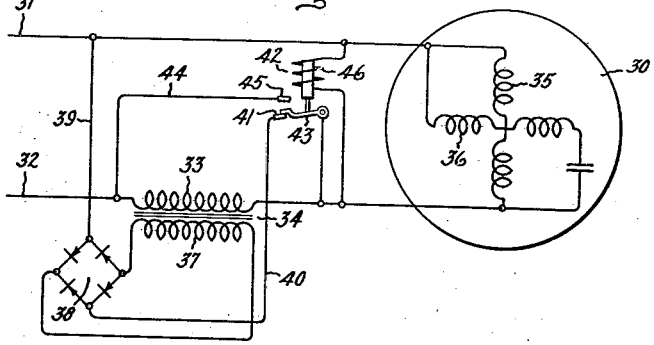

For a complete understanding of my invention, reference should be had to the accompanying drawing, Fig. 1 of which is a circuit diagram illustrating my invention in one form; and Fig. 2 is a circuit diagram showing an alternative form.

Referring to the drawing, I have shown in Fig. 1 an electric motor 10, specifically illustrated as a split-phase capacitor motor, although I do not intend to be limited thereto since my invention is applicable to other electric motors as well, the motor 10 being supplied from a suitable source (not shown) through the supply conductors 11 and 12 which are in series circuit with a running winding 13 and a starting winding 14 respectively. Connected in series circuit with the supply conductor 12 and the motor 10 is provided a reactor 15 of the saturable core type, that is, a reactive winding wound on a saturable magnetic core 16.

A suitable direct-current winding 17 having a relatively high value of inductance is provided on the common magnetic core 16 to afford a means of increasing the flux in the core 16 and thereby decreasing the reactance value of the reactor 15 in a well-known manner. The direct-current winding 17 is fed from the direct-current terminals 18 of a suitable rectifier 19, such as a copper oxide rectifier, whose alternating-current terminals 20 are connected by the conductors 21 and 22 to the supply conductor 12 across the reactor 15. In this manner the potential drop across the reactor 15 is applied to the rectifier 19, direct current being supplied from the rectifier to the direct-current winding 17 on core 16. In addition, a shunt circuit 23, normally disconnected at starting by a relay 24, extends from the conductor 12 across the reactor 15. The normally open relay 24 has a voltage responsive winding 25 connected across the supply conductors 11 and 12 adjacent the terminals of the motor 10 and is arranged to operate when the voltage across motor terminals exceeds a predetermined value.

In operation, the motor 10 is connected directly to the source of alternating current (not shown) and current is supplied through the conductors 11 and 12. The inrush of high current that would ordinarily occur when the motor 10 is placed directly across the line, since the motor 10 has a relatively low impedance when developing no back E. M. F. at standstill, is reduced to a much lower value by the reactance of the reactor 15 which is designed to have a relatively high reactance value, before the flux in the core 16 is increased by reason of direct current flowing in the direct-current winding 17. In this manner, the usual high voltage drop in the line and large intake of current by the motor 10 at the instant of starting, which causes the greatest amount of detrimental lamp flicker, is reduced so that the lamp flicker is barely perceptible.

The high voltage drop across the reactor 15 immediately causes current to flow in the conductors 21 and 22 to the rectifier 19. The rectifier, in turn, supplies a direct current to the direct-current winding 17 which causes an increase of flux in the core 16, thereby reducing the reactance value of the reactor 15. As hereinbefore indicated, the direct-current winding 17 is of a relatively high inductance to limit the rate of transient building up of direct current in this winding, the inductance being of such a value that the direct current gradually approaches the maximum value only after a time delay of one-quarter to one-half second. A time delay of such duration is sufficient to allow only a gradual increase in current drawn from the source so that the brightness of the lamp load is not materially affected.

In the scheme illustrated in Fig. 1, it is true that, as the potential drop across the reactor 15 decreases, the potential available to force current through the alternating-current conductors 21 and 22 to the rectifier 19 also decreases, but sufficient potential is available to supply direct current in the winding 17 to achieve the gradual increasing saturating of the core 16 and reduction of the reactance of the reactor 15. The potential drop across the reactor 15 is of a magnitude more than sufficient to tend to bring the direct current in the winding 17 up to its full value instantly if it were not for the retarding effects of the high inductance of this winding. When the reactance of the reactor 15 has decreased to a predetermined value and the potential drop across the reactance has fallen sufficiently, the increased potential at the motor terminals then available causes the relay 24 to pick up to close the shunt circuit 23 for short circuiting the reactor 15. Approximately full line current will be supplied to the motor 10 through the low resistance circuit including the conductor 12, the shunt circuit 23 the motor 10 and the conductor 11. Since the reactor 15 is short circuited by the closing of the shunt circuit 23, the potential drop across the reactor is reduced to a very small value and accordingly the potential available on the rectifier is reduced, so that only a negligible direct current will be supplied to the winding 17.

Referring now to Fig. 2 which illustrates my invention in an other form, a suitable electric electric motor 30 is shown connected in series with a supply conductor 31 and a supply conductor 32 having in series circuit therewith a reactor 33 would on a magnetic core 34. The motor 30 is illustrated as a split-phase capacitor motor having the windings 35 and 36, although as before, I do not intend to be limited thereto. Also wound on the magnetic core 34 is a direct-current winding 37 having a relatively high inductance for introducing a time delay in the building up of a direct current therein, the winding 37 being energized through a rectifier 38 which is supplied with alternating current by a conductor 39 connected to the supply conductor 31 and another conductor 40 connected through a fixed contact 41 of a relay 42 to the supply conductor 32. A movable contact 43 on the relay 42 normally engages the fixed contact 41 connected to the conductor 40 for completing the circuit through the conductor 46 to the line 32 when the motor 30 is de-energized and during the initial starting period, as will be hereinafter explained. A shunt circuit 44 is provided for short circuiting the reactor 33 when the relay 41 picks up to engage a fixed contact 45 arranged to cooperate with the movable contact 43. The winding 46 of the voltage responsive relay 41 is connected across the supply conductors 31 and 32 adjacent the terminals of the motor 30.

To operate the motor 30, the supply conductors 31 and 32 are connected to the source (not shown), the current to the motor 30 being materially reduced by the initial high reactance of the reactor 33. Simultaneously, alternating current is fed to the rectifier 38 through the conductor 39, the conductor 40, the fixed contact 41 and the movable contact 43. Direct current is then supplied from the rectifier 38 to the direct-current winding 37, but the value of this direct current is small at first due to the relatively high inductance of the winding 37, the current gradually increasing as this inductive effect is overcome. As explained before in connection with Fig. 1, a time delay of one-quarter second to one-half second is introduced in the building up of the direct current in the winding 37 to its full value. If desired, of course, the inductance of the winding 37 may be increased to provide a time delay in the building up of the direct current of even greater duration than one-half second.

With the gradual increase of direct current in the winding 37, there is a corresponding decrease in the reactance value of the reactor 33 because of the increased flux in the core 34, thereby decreasing the potential drop across the reactor 33. When this potential drop is decreased to a predetermined value, sufficient potential is available across the terminals of the motor and the winding of the relay 41 to cause the relay 41 to pick up, its movable contact 43 engaging the fixed contact 45 to close the shunt circuit 44 across the reactor 33 and short circuit the reactor. Simultaneously, the movable contact 43 of the relay 42 is disengaged from the contact 41, and the alternating current supply to the rectifier 38 is disconnected. The motor 30 then receives approximately full line current through its circuit including the supply conductor 32, the shunt 44 and the supply conductor 31, and the motor is operated at full speed. The introduction of the relatively high reactance of the reactor 33 in the motor circuit at starting together with the gradual decrease in this reactance and finally the short circuiting of the reactor 33 is effective to reduce and minimize lamp flicker so that it is barely perceptible and not so great a source of annoyance to the users of the light as was previously the case.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A starting device for an alternating current electric motor comprising a saturable core reactor arranged to be connected in series circuit with an alternating current motor at starting, means including a direct current winding having a relatively high inductance for introducing a substantial time delay in the building up of direct current in said winding gradually to reduce the reactance value of said reactor, a switch for short circuiting said reactor, and means responsive to the reduction of reactance of said reactor value for operating said switch to increase the voltage on said motor.

2. A starting device for an alternating current electric motor comprising a reactor arranged to be connected in series circuit with an alternating current motor at starting, a magnetic core for said reactor, a high inductance direct current winding on said core for gradually reducing the reactance value of said reactor over a substantial time interval, means including a rectifier for supplying direct current to said winding, a switch for short circuiting said reactor, and means responsive to a predetermined terminal voltage on the motor for operating said switch.

3. A starting device for an alternating current motor comprising a reactor arranged to be connected in series circuit with an alternating current motor at starting, a magnetic core for said reactor, a direct current winding on said core for gradually reducing the reactance value of said reactor, means including a rectifier having its alternating current terminals connected across said reactor for supplying direct current to said winding, a switch for short circuiting said reactor, and means responsive to the reduction of reactance of said reactor to a predetermined value for operating said switch to increase the voltage on the motor and simultaneously to disable said direct current winding.

4. A starting device for an alternating current electric motor comprising a reactor having two terminals arranged to be connected in series circuit with an alternating current motor at starting, a magnetic core for said reactor, a direct current winding on said core having a high inductance for introducing a substantial time delay in the building up of direct current in said winding, and means including a rectifier having its alternating current terminals connected across said reactor terminals for supplying direct current to said winding.

5. The combination with an electric motor and a source of alternating current supply therefor of starting means for said motor comprising a saturable core reactor in series circuit with said source for limiting the current to said motor at starting, means including a direct current winding having a relatively high inductance for introducing a substantial time delay in the building up of direct current in said winding gradually to reduce the reactance value of said reactor, and means responsive to the reduction of reactance of said reactor for short circuiting said reactor, whereby the starting current to said motor is maintained below a predetermined maximum.

6. In combination, an alternating current load having a relatively low initial impedance and a relatively high working impedance, a reactor connected in series with said load, a core for said reactor, a single direct current winding arranged in inductive relation to said core, and means for supplying direct current to said winding, said winding being so arranged that the transient build-up of direct current therein occupies approximately the same time interval as is required for variation of said load impedance from its initial value to its working value.

7. In combination, an alternating current load having a relatively low initial impedance and a relatively high working impedance, said high working impedance being attained a predetermined time interval after the application of power to said load, a reactor connected in series with said load, a core for said reactor, a single direct current winding arranged in inductive relation with said core and having an inductance such that the transient build-up of current therethrough occupies a time interval approximately equal to said predetermined time interval.

LOUIS W. THOMPSON.